United States Patent [19]
Wallander et al.

[11] Patent Number: 4,632,804
[45] Date of Patent: Dec. 30, 1986

[54] FUEL ASSEMBLY FOR A BOILING WATER REACTOR

[75] Inventors: Anders Wallander; Bo Borrman, both of Västerås; Arne Månsson, Surahammar all of Sweden

[73] Assignee: Ab Asea Atom, Vasterås, Sweden

[21] Appl. No.: 632,074

[22] Filed: Jul. 18, 1984

[30] Foreign Application Priority Data

Aug. 4, 1983 [SE] Sweden .................. 8304263

[51] Int. Cl.⁴ .................................. G21C 3/32
[52] U.S. Cl. ........................ 376/444; 376/439; 376/448
[58] Field of Search .............. 376/439, 443, 444, 448

[56] References Cited

U.S. PATENT DOCUMENTS

| | | | |
|---|---|---|---|
| 4,416,852 | 11/1983 | Nylund | 376/439 X |
| 4,478,786 | 10/1984 | Andersson et al. | 376/444 |
| 4,526,744 | 7/1985 | Borrman et al. | 376/444 X |
| 4,526,745 | 7/1985 | Nyland et al. | 376/444 X |
| 4,526,746 | 7/1985 | Fredin | 376/444 |

FOREIGN PATENT DOCUMENTS 36142 9/1981 European Pat. Off. ............ 376/444

*Primary Examiner*—Peter A. Nelson
*Attorney, Agent, or Firm*—Pollock, Vande Sande & Priddy

[57] ABSTRACT

A fuel assembly for a boiling water reactor comprises four bundles of vertical fuel rods (5). The bundles are surrounded by a common fuel channel (2) and each provided with a top tie plate (10) and a bottom tie plate (11). The four bottom tie plates are supported by a common supporting plate (18) which is inserted into, and supported by, the inlet sleeve (15) of the fuel assembly. Each bottom tie plate (11) includes an annular horizontal contact surface (24) abutting the supporting plate, and a non-round guide portion which is arranged, with no mentionable play, in a corresponding, non-round, through-hole (19) in the supporting plate (18).

3 Claims, 4 Drawing Figures

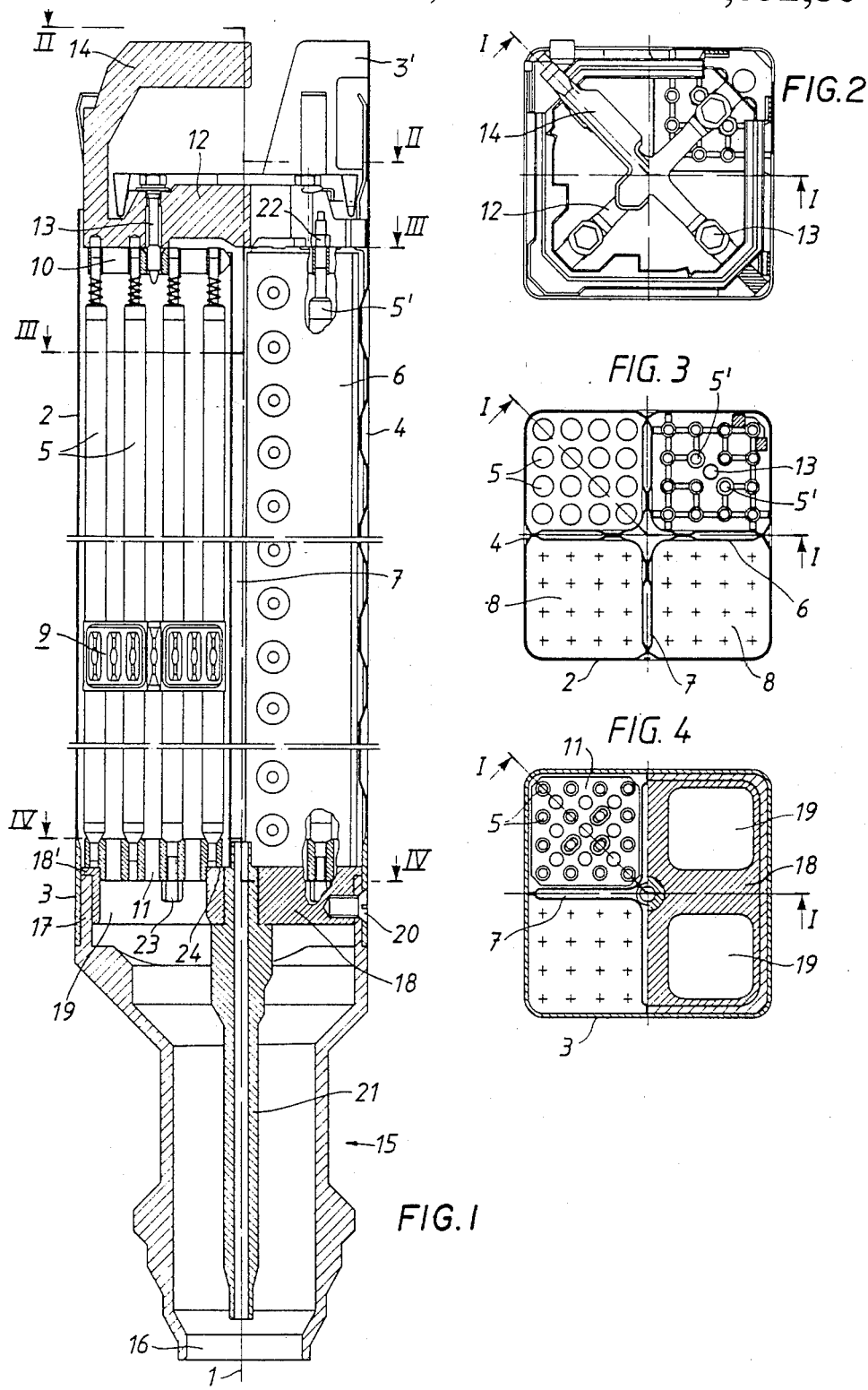

FUEL ASSEMBLY FOR A BOILING WATER REACTOR

TECHNICAL FIELD

The present invention relates to a fuel assembly for a boiling water reactor, comprising a plurality of vertical fuel rods, a fuel channel enclosing said fuel rods and having a vertical center axis and an approximately rectangular cross-section, an inlet sleeve secured to a lower end portion of said fuel channel, and a supporting device supported by said inlet sleeve and arranged to support said fuel rods, said fuel channel being divided into four sub-channels by means of a hollow stiffening device secured to said fuel channel, having a cruciform cross-section and at least the same length as the active parts of said fuel rods, each of said sub-channels surrounding a bundle of fuel rods which comprises about ¼ of the total number of fuel rods in the fuel assembly, each one of said fuel rod bundles comprising a bottom tie plate, a top tie plate, means for achieving a tensile-force transmitting connection between said tie plates and a plurality of spacer devices arranged axially one after the other.

DISCUSSION OF PRIOR ART

A fuel assembly of a similar kind is disclosed in the published European patent application No. 0065238. The known fuel assembly has four bundles of fuel rods, each of which has a square bottom tie plate and a square top tie plate, and a bottom piece made with only circular cross-section, from which a central water tube is suspended by means of four radially extending arms which are welded to the water tube and the bottom piece. Each bottom tie plate rests on a corresponding inclined, upwardly-directed surface portion of the water tube and on two upwardly-directed, inclined surfaces, each of which is formed in an axial projection provided in the upper part of the bottom piece.

In the known fuel assembly, the four bundles are supported in a manner which is unsatisfactory in several respects. Thus, the security against rotation is not sufficiently great, which involves a risk of oscillating rotational movements arising in the different fuel rod bundles. Further, the points of support are so unevenly distributed that there is a risk of a tilting movement about a horizontal axis.

In a fuel assembly of the kind described in the introduction, the neutron radiation implies that all the fuel rods will be extended somewhat after some time in operation. If this extension of rods in one of the fuel rod bundles is smaller than in one of the other bundles, a lifting movement of this bundle may take place. With the known fuel assembly, such a lifting has the effect that the bottom tie plate of the lifted bundle—to some extent—will be free to move in a horizontal direction.

DISCLOSURE OF THE INVENTION

With a fuel assembly according to the invention, the intention is to overcome the above-mentioned drawbacks and to construct the structural elements which support the fuel rods in such a way that a fuel assembly according to the invention will be considerably simpler to manufacture than the known fuel assembly mentioned above.

The fuel rods are supported by a supporting device comprising a horizontal supporting plate. The supporting plate has an approximately rectangular outer circumference, at least regarding a major portion which is inserted into and secured to an upper, rectangular portion of the inlet sleeve without any mentionable play. The supporting plate is provided with four through-going supporting plate holes, which are each arranged in a corresponding quadrant of said supporting plate. The bottom tie plate of each fuel bundle has an upper portion with a downwardly-directed contact surface resting on said supporting plate, and a non-round lower portion which is surrounded by a non-round guide portion of said supporting plate hole. This guide portion is for the major part defined by a first closed vertical cylindrical surface, and the non-round lower bottom tie plate portion is for the major part defined by a second closed, vertical cylindrical surface. These two cylindrical surfaces are adapted to each other in shape in such a way that no mentionable freedom of rotation or freedom of horizontal movement of said non-round bottom portion with respect to said guide portion exists.

Even if a minor lifting of a fuel bundle takes place due to the fuel rod extension mentioned above, the height above normal level may amount to at least 10% of the maximum thickness of the bottom tie plate without any increase in the freedom of rotating or horizontal movement mentioned above. The lower end of the stiffening device preferably abuts the supporting plate. Horizontally directed fasteners are arranged to connect the fuel channel and the inlet sleeve to the supporting plate, the latter contributing substantially to the rigidity of the fuel assembly.

BRIEF DESCRIPTION OF THE DRAWINGS

In the drawings, FIG. 1 shows a vertical section through a fuel assembly according to the invention along the lines I—I on FIGS. 2, 3, 4, whereas FIGS. 2, 3 and 4 show sections along II—II, III—III and IV—IV, respectively, on FIG. 1.

DESCRIPTION OF THE PREFERRED EMBODIMENT

In the drawings, 1 designates the vertical centre axis of the fuel assembly. The fuel assembly has a fuel channel 2 made of Zircaloy®. A lower end portion 3 thereof is made with a relatively great wall thickness. The upper end of the fuel channel is provided with two lifting ears 3', and the entire fuel assembly can be lifted by a lifting force applied to these ears. Along its entire length the fuel channel 2 has a substantially square cross-section, that is, the cross-section is square with the exception of the bevelling of the corners and a plurality of inwardly-directed projections 4, which are embossed in the walls of the fuel channel. The fuel channel 2 surrounds sixty-four fuel rods 5 and 5'. The walls of the fuel channel are stiffened by means of a hollow stiffening devices 6 with cruciform cross-section, the length of which is at least the same as the active length of the fuel rods. A vertical channel 7 for moderator water made with cruciform cross-section traverses the stiffening device 6. The stiffening device 6 has four wings, each of which is fixed to a corresponding wall of the fuel channel 2 by means of a plurality of weld joints comprising several welding seams arranged on the projections 4 as well as a welding seam along part of the thick-walled portion of the fuel channel. The stiffening device 6 divides the fuel channel 2 into four partial channels 8, each of which surrounding a bundle comprising ¼, or alternatively about ¼, of the total number of fuel rods.

Each bundle has a substantially rectangular cross-section, i.e. an imaginary flexible tape, wound around the bundle, approximately forms a rectangle. In each bundle the fuel rods are positioned in relation to each other with the aid of a plurality of spacer devices 9 arranged vertically one after the other and in mutual spaced relationship to each other, and with the aid of a top tie plate 10 and a bottom tie plate 11, the fuel rods of the bundle resting on the latter.

As with the above-mentioned known fuel assembly, the majority of the fuel rods in each bundle are arranged in the bottom tie plate with freedom of movement in a direction vertically upwards, whereas at least one fuel rod in each bundle consists of a tie rod 5', which together with an upper nut 22 and a lower nut 23 constitutes a detachable tensile-force transmitting connection between the top tie plate 10 and the bottom tie plate 11 of the bundle. The four fuel rod bundles are positioned with respect to each other by means of a common top tie plate 12, which is arranged in the fuel channel 2 above the stiffening device 6. Each top tie plate 10 is detachably attached to the common top tie plate 12 by means of an individual connection device which is adapted for lifting the bundle with the associated bottom tie plate 11 and top tie plate 10.

In the embodiment of the invention shown in the drawings, the last-mentioned connection device consists of a screw bolt 13 which is inserted through a hole in the common top tie plate 12 and screwed into the top tie plate 10 of the bundle. The common top tie plate 12 is provided with a lifting yoke 14 with the aid of which all the fuel rod bundles can be lifted out of the fuel channel in one single lifting operation.

The fuel channel 2 is supported by a bottom sleeve 15 made of stainless steel. At its lower end the sleeve 15 is provided with an inlet opening 16 for cooling water and moderator water. The bottom sleeve has a lower portion extending along most of the total vertical extension of the bottom sleeve and being made all over with a circular inner cross-section and a circular outer cross-section. Further, the bottom sleeve has an upper, hollow-cylindrical portion 17 made with a substantially constant wall thickness, the outer circumference of said portion being square with rounded corners and practically uniform with the inner circumference of the lower portion 3 of the fuel channel. The upper sleeve portion 17 is inserted into the lower, thick-walled portion 3 of the fuel channel. A substantially cylindrical supporting plate 18, which is made of stainless steel and with a substantially rectangular external cross-section shape, is for the most part inserted into the upper sleeve portion 17 with no mentionable play.

The supporting plate 18 is formed with a flange 18', whereby a downwardly-directed annular and substantially square surface of the flange 18' makes contact with the upwardly-directed annular end surface of the bottom sleeve 15. Further, the supporting plate 18 is provided with four through-holes 19 which are each located in a corresponding quadrant. Each hole 19—at least in an upper portion of the supporting plate 18—is defined by means of a closed, vertical cylindrical surface having a non-round, preferably rectangular cross-section shape. Each hole 19 is adapted to be able to receive—with no mentionable play—a cylindrical lower portion of a corresponding bottom tie plate 11. This lower tie plate portion is formed with vertical wall surfaces, and it has along most of its vertical extension an outer circumference which is practically uniform with the inner circumference of the hole 19.

In addition to the above-mentioned lower portion, the bottom plate 11 includes an upper portion having a larger and substantially rectangular cross-section, and a greater height, said upper portion being formed with a downwardly-directed, annular contact surface which is substantially rectangular and which makes contact with an upwardly-directed supporting surface provided in the flange 18'.

In each one of the four sides of the fuel channel 2, at least one screw bolt 20 is inserted horizontally through a hole in the thick-walled channel portion 3 and through a hole in the wall of the bottom sleeve 15, and screwed into a threaded hole in the supporting plate 18, so that the components 1, 3 and 15 are secured to each other.

The supporting plate 18 is provided with a central, threaded through-hole, into which a water tube 21 for the supply of moderator water to the channel 7 is screwed.

We claim:

1. A fuel assembly for a boiling water reactor, comprising a plurality of vertical fuel rods (5), a fuel channel (2) enclosing said fuel rods and having a vertical centre axis (1) and an approximately rectangular cross-section, an inlet sleeve (15) secured to a lower end portion of said fuel channel, and a supporting device supported by said inlet sleeve and arranged to support said fuel rods, said fuel channel (2) being divided into four sub-channels (8) by means of a hollow stiffening device (6) secured to said fuel channel (2), having a cruciform cross-section and running along at least the active lengths of said fuel rods, each of said sub-channels (8) surrounding a bundle of fuel rods which comprises about ¼ of the total number of fuel rods in the fuel assembly, each one of said fuel rod bundles comprising a bottom tie plate (11), a top tie plate (10), means (22, 23) for achieving a tensile-force transmitting connection between said tie plates and a plurality of spacer devices (9) arranged axially one after the other, wherein said supporting device comprises a horizontal supporting plate (18) formed with an approximately rectangular circumference, said supporting plate being inserted into said inlet sleeve (15) and being provided with four through-going supporting plate holes (19), which are each arranged in a corresponding quadrant of said supporting plate (18), each bottom tie plate (11) having an upper portion with a downwardly-directed contact surface (24) resting on said supporting plate (18), and a non-round lower portion which is surrounded by a non-round guide portion of said supporting plate hole (19), said guide portion for the major part being defined by a first closed vertical cylindrical surface, said non-round lower bottom tie plate portion for the major part being defined by second closed, vertical cylindrical surface, said cylindrical surfaces being adapted to each other in shape in such a way that no mentionable freedom of rotation or freedom of horizontal movement of said non-round lower bottom portion with respect to said guide portion exists.

2. A fuel assembly according to claim 1, wherein said fuel channel (2) has a lower integrated portion (13) which is made with a greater wall thickness than the other portions of the fuel channel and which is arranged to surround—with no mentionable play—an upper, approximately square portion (17) of said inlet sleeve, said lower portion of the fuel channel, said inlet sleeve and said supporting plate (18) being secured to each other by means of a plurality of horizontally directed screw bolts screwed into said supporting plate.

3. A fuel assembly according to claim 2, wherein said supporting plate is provided with a vertical, through-going central hole, into which a water tube (21), opening out at the lower end of the bottom piece, is inserted, said water tube at its upper end being hydraulically connected to a vertical channel (7) for moderator water extending through said stiffening device.

* * * * *